Jan. 10, 1933.   H. CARLSON   1,893,858
SCALE
Filed Oct. 31, 1929   3 Sheets-Sheet 1

Witness:
William P. Kilroy

Inventor:
Harry Carlson

Jan. 10, 1933.   H. CARLSON   1,893,858
SCALE
Filed Oct. 31, 1929   3 Sheets-Sheet 2

Witness:
William P. Kilroy

Inventor
Harry Carlson
By Dyrenforth, Lee, Chritton and Wiles, Attys

Jan. 10, 1933.  H. CARLSON  1,893,858
SCALE
Filed Oct. 31, 1929    3 Sheets-Sheet 3

Witness:
William P. Kilroy

Inventor:
Harry Carlson
By Dyrenforth, Lee, Chritton and Wiles, Attys.

Patented Jan. 10, 1933

1,893,858

UNITED STATES PATENT OFFICE

HARRY CARLSON, OF CHICAGO, ILLINOIS

SCALE

Application filed October 31, 1929. Serial No. 403,782.

My invention relates to scales, and has among its other objects the production of devices of the kind described that are durable, efficient and satisfactory for use wherever found applicable.

A particular object of the invention is to provide a compact scale which is simple in construction.

Another particular object of the invention is to provide an improved coin-controlled scale.

One form of the invention is embodied in a scale adapted to be positioned upon the floor of a room, and preferably comprises a frame relatively low is height and a platform operatively connected to a piston slidably journaled in a cylinder, the cylinder being filled with a liquid and being preferably connected to a gage of the Bourdon tube type. In a preferred form of the invention, the scale is coin-controlled.

Another form of the invention is embodied in a scale comprising a base supporting a bag-like receptacle which, in turn, supports a platform upon which one may stand to be weighed. Connected to the receptacle is a gage having a dial calibrated to indicate the weight to which the platform is subjected.

Many other objects and advantages will appear as this description progresses, reference being had to the accompanying drawings, wherein.

Figure 1:
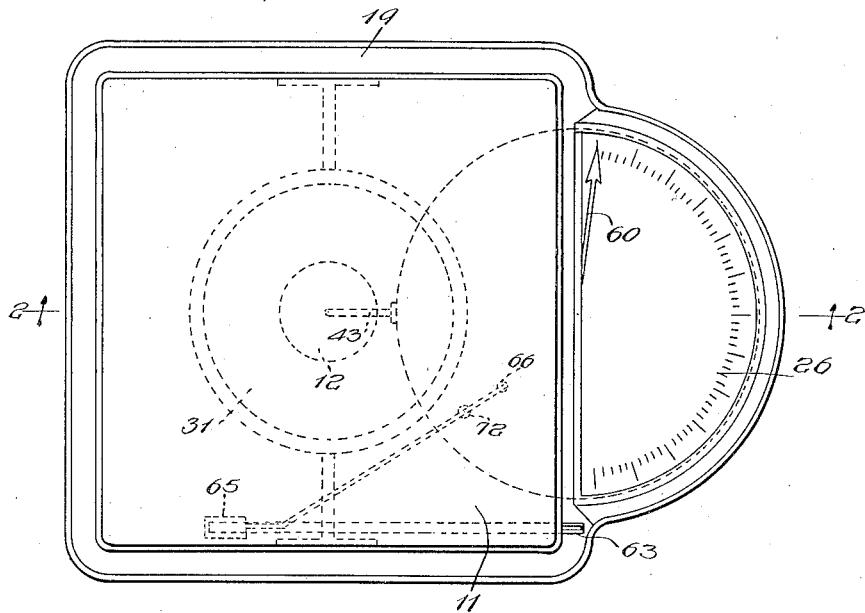
Figure 1 is a plan view of a scale embodying the invention.
Figure 2:
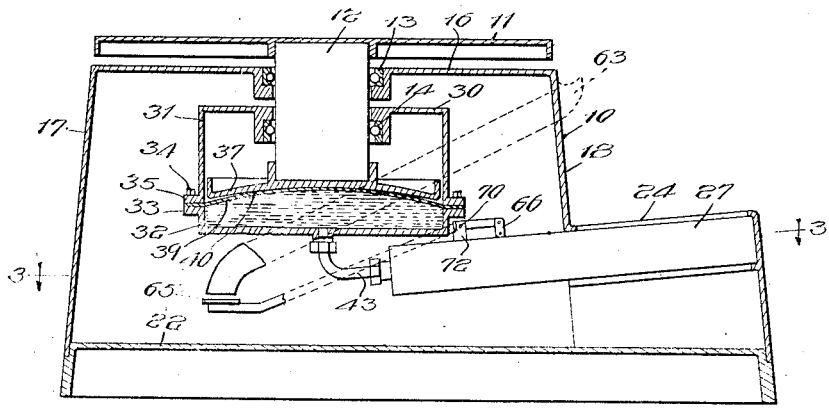
Fig. 2 is a section taken on line 2—2 of Fig. 1.

In the drawings, I have illustrated two forms of the invention embodied in scales adapted to be positioned upon the floors of stores, hotel lobbies, bathrooms, etc., but it is to be understood that my invention is limited to this use only to the extent indicated in the appended claims.

The scale illustrated in Figs. 1 to 5, inclusive, of the drawings, preferably comprises a frame which is designated, generally, by the reference character 10 and is preferably relatively low in height so that one may easily step upon a cooperating substantially rectangular platform 11 mounted upon the upper end of a vertically disposed post or tube 12, the tube 12 being slidably journaled in ball-bearing devices 13 and 14. The ball-bearing device 13 is mounted in the upper wall 16 of the frame 10 which also comprises a front wall 17, a rear wall 18 and side walls 19. The frame 10 is preferably mounted upon a base 22, the construction being such that the frame 10 and the weighing mechanism may be removed as a unit from the base.

As shown, the rear wall 18 is preferably offset to provide an apertured inclined wall 24 through which the dial 26 of a gage 27 is visible to the person being weighed. It is readily understood that the inclined position of the dial causes it to be readily readable by the one being weighed.

The ball-bearing device 14 is preferably mounted in the upper wall 30 of a cylinder 31 which is preferably secured rigidly to the frame, and is preferably closed at one end by a removable head 32, the head 32 being provided with an annular flange 33 secured by bolts 34, or the equivalent, to an annular flange 35 formed upon the cylinder 31. Disposed within the cylinder 31 and preferably rigidly secured to the lower end of the tube 12 is a piston 37 which rests upon a diaphragm 39 preferably formed from rubber, or the equivalent. The diaphragm 39 has its periphery clamped between the flanges 35 and 33, and is preferably molded to provide a dished central portion 40 having its convex surface in engagement with a concave surface formed upon the piston 37. In the preferred embodiment of the invention, the curvature of the convex surface provided upon the piston 37 has a larger radius than the convex surface of the dished portion 40. The outer edges of the piston 37 are preferably rounded so that they will not cut or injure the diaphragm 39.

Figure 3:
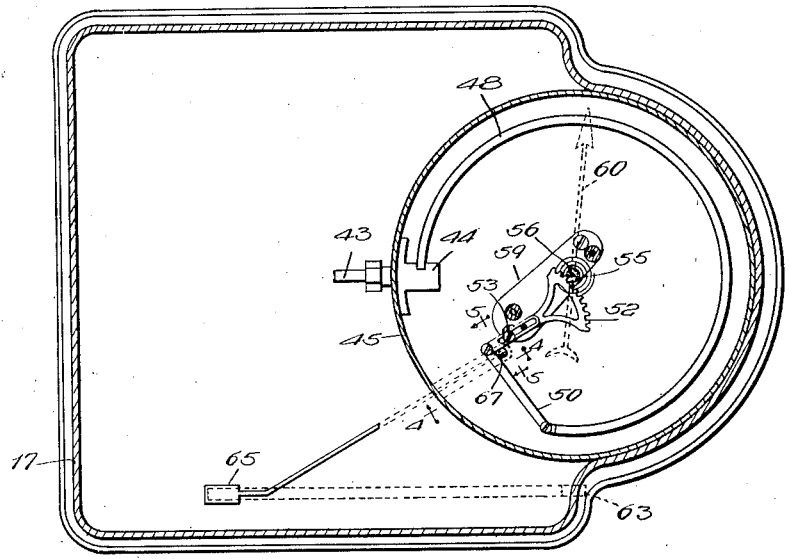
Fig. 3 is a section taken on line 3—3 of Fig. 2.

The head 32 of the cylinder is preferably filled with a suitable liquid, and the head preferably communicates with the gage 27 through a tube 43 which has one of its ends rigidly secured to a hollow bracket member 44 carried by a housing 45 provided for the gage 27 (see Fig. 3). One end of a Bourdon tube 48 is connected by a link 50 to a link 51 which is adjustably secured to a gear segment 52 pivoted upon a pin 53. Meshing with the gear segment 52 is a pinion 55 secured to a pin 56 which is journaled in bracket members 59 mounted within the housing 45. Secured to the pin 56 is a needle or pointer 60 adapted to traverse the dial 26 which is, of course, calibrated in any suitable manner.

Figure 4:
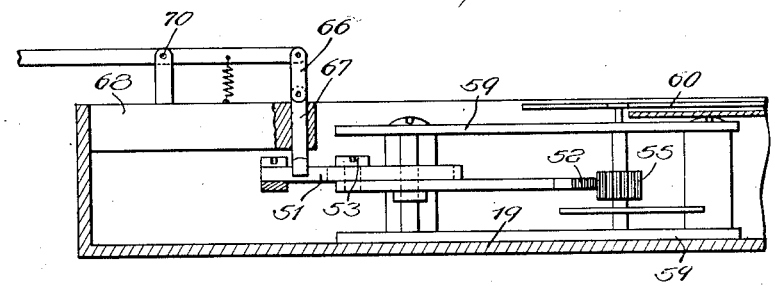
Fig. 4 is an enlarged section taken on line 4—4 of Fig. 3.
Figure 5:
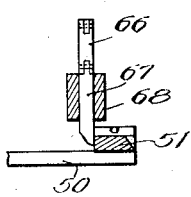
Fig. 5 is an enlarged section taken on line 5—5 of Fig. 3.

Projecting from the rear wall 18 is one end of a coin-chute 63 which has its other end disposed above one end of a lever 65, the other end of the lever 65 being connected by a link 66 to a latch member 67 slidably journaled in a bracket member 68 carried by the housing 45. The lever 65 is pivoted intermediate its ends upon a pin 70 carried by a bifurcated bracket member 72 which projects from the housing member 45. As best shown in Figs. 3, 4 and 5, the latch member 67 is normally disposed in a position wherein its lower end lies in the path of the link 51, and, unless it is withdrawn from this position, it prevents operation of the scale. However, if a suitable coin is dropped into the chute 63, it will engage and displace the lever 65 to withdraw the latch member 67 from the path of the link 51, whereupon a person standing upon the scale will be weighed.

Figure 6:
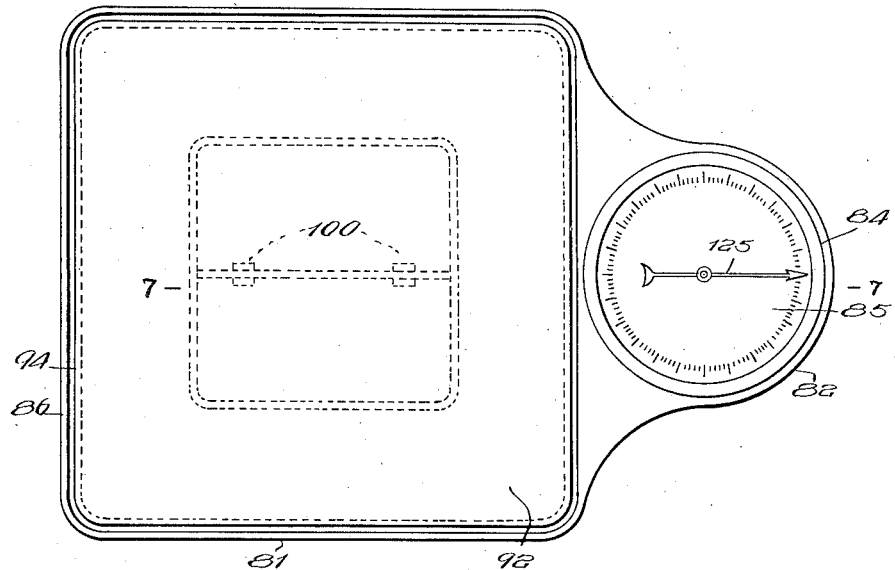
Fig. 6 is a plan elevation of a scale embodying another form of the invention.
Figure 7:
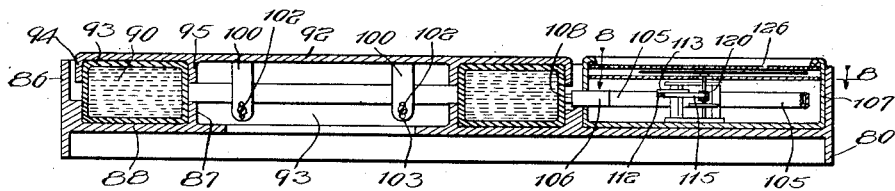
Fig. 7 is a section taken on line 7—7 of Fig. 6.
Figure 8:
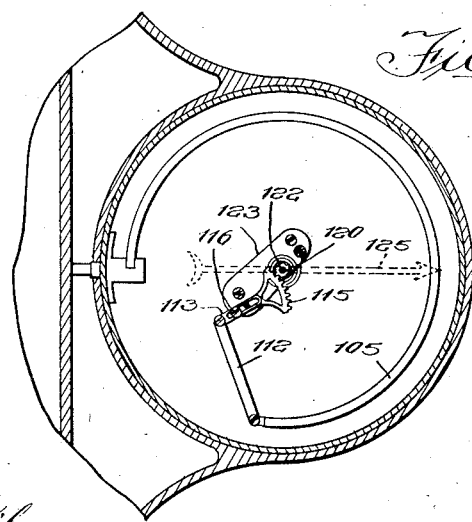
Fig. 8 is an enlarged section taken on line 8—8 of Fig. 7.

Referring now to Figs. 6 to 8, inclusive, wherein I have illustrated another form of the invention, the reference character 80 designates generally a frame or base which preferably comprises a substantially rectangular portion 81 formed integral with a smaller projecting portion 82 having a circular recess 84 in which a gage 85 is mounted. The base 80 is preferably provided with an upwardly extending flange 86 bounding the periphery of the rectangular periphery of the rectangular portion 81 and the flange 86 cooperates with a flange 87 to form an endless groove 88 in which a bag-like receptacle or endless tube 90 is supported. The bag-like receptacle 90 is preferably formed from rubber, or the equivalent, and it is preferably arranged to support a platform 92, which is also provided with a groove 93 into which the receptacle 90 projects, the endless groove 93 being formed by flanges 94 and 95, preferably formed integral with the platform 92. It is readily understood that the receptacle 90 could be annular in form if it were so desired, or that it could be given any other form to correspond to the shapes of the base 90 and the platform 92.

Obviously, the platform 92 is supported by the receptacle 90, and if a weight is placed upon the platform it will tend to compress the receptacle. It is readily understood that the pressure obtaining in the receptacle at any time is substantially proportional to the weight upon the platform.

In the preferred embodiment of the invention, the receptacle 90 is preferably filled with liquid, but in some instances I may prefer to have the receptacle filled with air.

To limit lateral displacement of the platform 92, I preferably provide a pair of bifurcated lugs 100 upon the platform 92, which lugs slidably engage a flange 93 formed integral with the base 80. Pins 102 carried by the flange 93 project through slots 103 formed in the bifurcated lugs 100 and limit lateral displacement of the platform to the right or left (Fig. 7). The pins also prevent accidental removal of the platform 92 from the base 80.

The gage 84 preferably comprises a Bourdon tube 105 which has one of its ends secured to a hollow bracket 106, the hollow brackets 106 being rigidly secured to a housing 107 provided for the gage. The Bourdon tube communicates through the hollow bracket 106 with tube 108 which communicates with the interior of the receptacle 90. When the receptacle 90 is subjected to weight, in addition to that of the platform 92, the increase in pressure resulting within the receptacle will be duplicated in the Bourdon tube 105 and it will expand substantially in proportion to the weight placed upon the platform.

As best shown in Fig. 8, the free end of the Bourdon tube 105 is connected by a link 112 to a link 113 which is adjustably secured to a gear segment 115 pivoted upon a pin 116. Meshing with the gear segment 115 is a pinion 120 secured to a pin 122 journaled in bracket members 123 carried by the housing 107. Also secured to the pin 122 is a needle or pointer 125 adapted to traverse a scale 126 which may be calibrated in any suitable manner so that it will cooperate with the pointer 125 to indicate the weight to which the platform is subjected.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A scale comprising a frame, a platform, a piston operatively connected to said platform and having a concave surface, a cylinder associated with said piston, a diaphragm extending transversely in said cylinder and formed with a convex surface engageable by said concave surface, said cylinder being adapted to hold a quantity of liquid between said diaphragm and an end wall thereof, and indicating means operatively connected to said cylinder and operable by said liquid.

2. A scale comprising a base having a groove disposed around its periphery, a yielding bag-like receptacle disposed in said groove and conforming substantially to the shape thereof, a platform supported by said receptacle and a gage operatively connected to said receptacle.

3. A scale comprising a frame, a platform movably mounted in the frame, means forming a chamber in said frame for holding a quantity of fluid, said means including a flexible wall supporting said platform, a gage disposed below the normal level of said platform, said gage including a Bourdon tube operatively connected to said chamber and being disposed at a large angle to the vertical, and coin-controlled means within the frame for controlling said gage.

4. A scale comprising a frame, a platform movably mounted in the frame, means forming a chamber in said frame for holding a quantity of fluid, said means including a flexible wall supporting said platform, a gage operatively connected to said chamber, said gage including a dial disposed below the normal level of said platform and at a large angle to the vertical, and coin-controlled means within the frame for controlling said gage.

5. A scale comprising a frame, a platform movably mounted in the frame, means forming a chamber in said frame for holding a quantity of fluid, said means including a flexible wall supporting said platform, a gage operatively connected to said chamber, said gage including a dial mounted approximately at the same height as said platform and disposed at a large angle to the vertical, and coin-controlled means within the frame for controlling said gage.

6. A scale comprising a frame, a platform movably mounted in the frame, a gage operatively connected to said platform, said gage including a dial mounted in said frame at approximately the same height as said platform, and coin-controlled means within the frame for controlling said gage, said coin-controlled means being disposed at a lower level than said platform.

In testimony whereof, I have hereunto set my hand, this 2d day of October, 1929.

HARRY CARLSON.